May 6, 1924.

R. MARTTAL

DITCH PLOW

Filed Sept. 9, 1918

1,492,647

Inventor
Reno Marttal
By
Attorneys

Patented May 6, 1924.

1,492,647

UNITED STATES PATENT OFFICE.

RENO MARTTAL, OF HAZELTON, IDAHO.

DITCH PLOW.

Application filed September 9, 1918. Serial No. 253,290.

*To all whom it may concern:*

Be it known that I, RENO MARTTAL, a citizen of the United States, residing at Hazelton, in the county of Minnidoka and State of Idaho, have invented certain new and useful Improvements in Ditch Plows, of which the following is a specification.

My said invention relates to ditch plows and it is an object thereof to provide a plow of this type which shall form a ditch with vertical parallel sides and shall shape the earth thrown out of the ditch to form a continuous rounded bank at each side of the ditch.

A further object is to provide a ditch plow which is adjustable in width for making ditches of varying widths.

Figure 1:
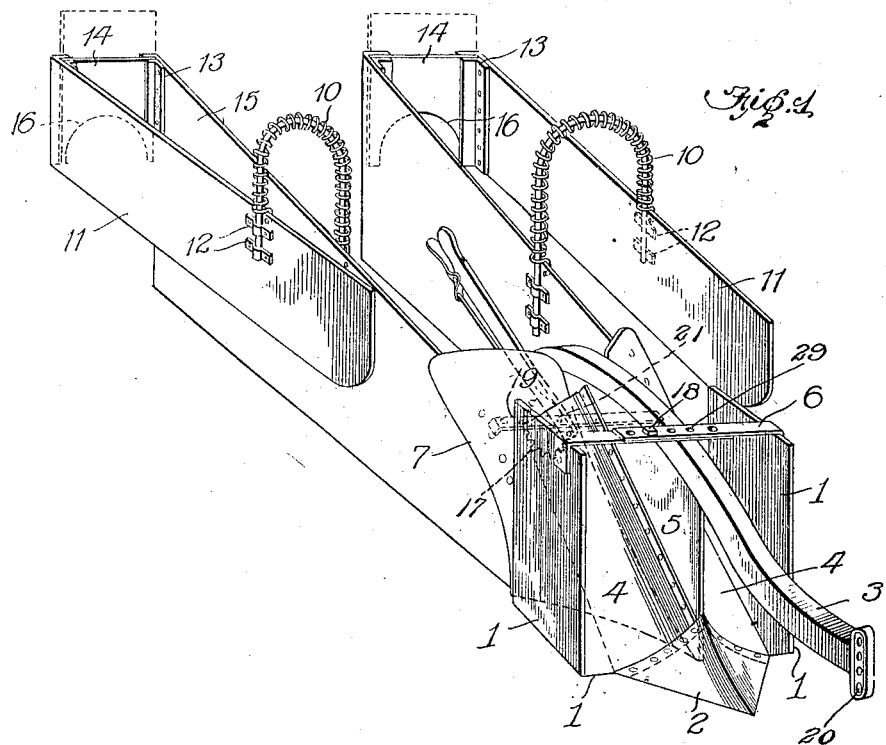
Figure 2:
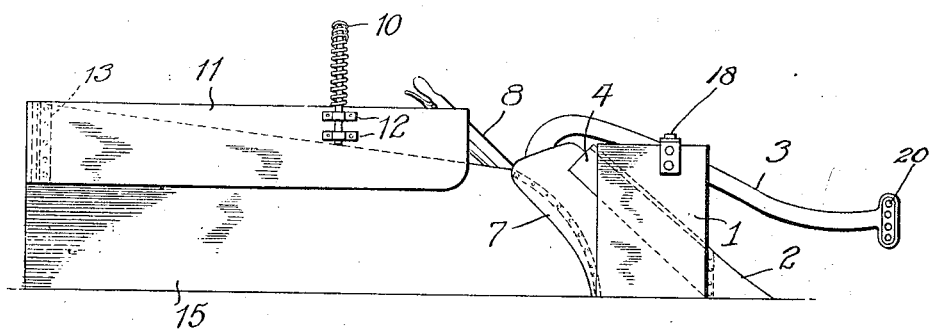

Referring to the accompanying drawings which are made a part hereof and on which similar reference characters indicate similar parts, Figure 1 is a perspective, and Figure 2, is a side elevation.

In the drawings, the numerals 1, 1 indicate a pair of spaced upright cutting members adapted to cut the soil at each side of the ditch and at their lower horizontal edges adapted to form a continuation of the share 2 and supplement its action, in certain of their adjusted positions.

The share 2 has oppositely sloping sides and a central ridge running back to an upright member 5 which acts as a central cutter to divide the earth thrown up by the share into two equal parts, one part going to each moldboard. The lower end of the cutter may be secured to the lower bend of the plow beam or to any fixed part of the plow. The moldboards are made in two pairs the upper part 4 or upper moldboard of each pair being fixed to the rigid central cutter 5. The lower part, or lower moldboard 7 of each pair is rigidly fixed to a side cutter 1 underneath its respective fixed moldboard 4.

The cutters 1, 1 are adjustably spaced so that the width of the ditch may be varied by adjusting them toward or from each other. A means for holding them in adjusted position at the top comprises a strip 6 on each side cutter and a pin or bolt 18 passing through any registering pair of holes 20 therein. Any suitable adjustable fastening means to hold the cutters in adjusted position relative to each other and to the remaining parts may be provided at the bottom of the device, but as this would be so located as to be inconvenient to manipulate and not readily accessible I have provided a hand-lever 8 connected to both cutters at the bottom and having a segment 17 by which it may be held in adjusted position. The lower transverse extensions of the cutters 1, 1 are supported against movement forward or back by any suitable means, e. g., by passing through guides underneath the upper moldboard, the adjustable moldboards 7 being bolted to the fixed moldboards 4, or to each other or to any fixed part of the plow. An adjustable brace 19 holds the rear ends of the lower mold board in place, each mold board having a pin or bolt adapted to engage any one of a series of holes 21 in the corresponding end of the brace.

Each of the lower moldboards 7—7 has fixed thereto a bankboard 15 which acts in the usual manner as a landside to hold the plow in position and to shape the side of the furrow. An auxiliary bankboard 11 is attached to each bankboard 15 in a position to run parallel thereto, preferably by bending a single strip of metal into the shape indicated and reenforcing the angles by corner braces 13, 13. The board 11 is cut away at the bottom so as to run on the surface of the ground. At the rear end of the device the transverse connecting portion between each pair of boards 11 and 15 is cut away for some distance above the ground and a sliding door 14 is mounted for vertical adjustment on each cross portion, said door having at its lower end a semi-circular opening 16.

The bankboards 11, 11 are supported to some extent against lateral and up-and-down movement relative to bankboards 15, 15 by bowed rods 10 fastened to the boards by clamps 12 or analogous means, and preferably surrounded by strong coiled torsion springs fast at their ends to the bankboards and acting to resist lateral movement of the ends of bankboards 11. By this means the boards 11 are permitted to swing laterally and up and down to accommodate themselves to inequalities in the ground.

In the operation of the device the connections between cutters 1, 1 are set according to the desired width of the ditch to be made, the doors 14 are set to afford an opening of appropriate size according to the depth of the plow and the motive power is started. It should be noted that the side cutters, the lower moldboards, and the inner and outer bankboards at each side of the plow are all adjustable together, these parts being rigidly fastened together and forming in effect a rigid laterally adjustable unit at each side of the machine. This secures the desirable result that when the cutters are moved to change the width of the ditch, the total moldboard width at each side, i. e., moldboard 4 plus the exposed portions of moldboard 7, is correspondingly changed. The share is also simultaneously widened, (or narrowed) the landside adjusted and all the bank-forming devices moved to position to correspond with the new position of the ditch-side-forming cutter and the adjustable moldboard. The earth turned up by the share is cut in two by the central cutter 5 and passes up along moldboards 4, 4 (or partly on moldboards 7, 7 if the cutters 1, 1 are far enough out to expose their lower horizontal edges). The earth passes to the lower moldboards 7, 7, these as well as moldboards 4, 4 being shaped to throw the earth to the side of the furrow, and falls alongside the upper part of bankboards 15 or at a little distance therefrom, the bankboards 11, 11 passing along one side of this loose earth to hold the same in place and boards 15 doing the same at the other side. If desired they may be spaced more closely together at the rear or otherwise modified in form to shape the earth preliminary to its final shaping by doorways 16 which round the same up at each side of the ditch in a continuous and symmetrical manner.

The depth of the plow in the earth may be adjusted by changing the front clevis in the usual manner from one hole 20 to another and the doors 14 are to be adjusted to vary the opening according to the depth of the plow and the amount of earth thrown up by the same.

Having thus fully described my said invention, what I claim as new and desire to secure by Letters Patent, is:

1. In a ditch plow, a share, a pair of oppositely-facing moldboards, a pair of bankboards running at the sides of the furrow and a pair of outer bankboards spaced from the first, said inner and outer bankboards at each side of the plow being adapted to receive between them the soil from the corresponding moldboard and embodying means to shape the soil into a ridge at the sides of the ditch, substantially as set forth.

2. In a ditch plow, a share, a pair of fixed moldboards, a pair of laterally adjustable moldboards under the fixed ones, a pair of bankboards fixed to and adjustable with said adjustable moldboards and an outer pair of bankboards spaced from and each adjustable with one of the first pair, said bankboards carrying means for shaping into a ridge the soil received from the moldboards, substantially as set forth.

3. In a ditch plow, a share, a pair of fixed moldboards, a pair of laterally adjustable moldboards under the fixed ones, a pair of bankboards fixed to and adjustable with said adjustable moldboards and an outer pair of bankboards spaced from and each adjustable with one of the first pair, said bankboards carrying means for shaping into a ridge the soil received from the moldboards, the bankboards of said first pair extending to the bottom of the furrow and those of the second running on or close to the unplowed ground, substantially as set forth.

4. In a ditch plow, a share, a pair of fixed moldboards, a pair of laterally adjustable moldboards under the fixed ones, a pair of bankboards fixed to and adjustable with said adjustable moldboards and an outer pair of bankboards spaced from and each adjustable with one of the first pair, said bankboards carrying means for shaping into a ridge the soil received from the moldboards, and means for supporting the forward ends of the outer bankboards from the inner bankboards, substantially as set forth.

5. In a ditch plow, a share, a pair of fixed moldboards, a pair of laterally adjustable moldboards under the fixed ones, a central cutter extending upward from the share, and outer cutters defining the sides of the ditch and adjustable with said adjustable moldboards, substantially as set forth.

6. In a ditch plow, means to form a furrow and to throw the soil to opposite sides of the plow, bankboards at each side of the plow adapted to receive such soil and to shape it into continuous ridges and means at the rear end of the bankboards whereby the shaping devices on the bankboards may be adjusted according to the depth of the plow in the ground, substantially as set forth.

7. In a ditch plow, a share having a central ridge and oppositely sloping sides, a beam above the share, a rigid vertical cutter connecting the share to the beam, a moldboard at each side of the cutter fixed thereto and to the share, a secondary moldboard below each of those first named, said secondary moldboards being laterally adjustable, a vertical outer cutter and a bankboard fixed to each of said moldboards acting as a landside, a secondary bankboard carried at the far side of each of said first named bankboards and having a free forward end, said bankboards riding on the surface of the ground, means on said first named bankboards for yieldably supporting the free forward ends of said secondary bankboards, each pair of said bankboards being adapted to receive between them the earth from the moldboards at one side of the plow, and having adjustable means at their rear ends for shaping such earth into a ridge, substantially as set forth.

8. A ditch plow having means to form a continuous ridge at the side of the ditch comprising an inner bankboard fixed to the plow at its forward end, an outer bankboard parallel to the inner bankboard and fixed thereto at its rear end, and a bowed rod connecting the free forward end of the outer bankboard to the inner bankboard, substantially as set forth.

9. A ditch plow having means to form a continuous ridge at the side of the ditch comprising an inner bankboard fixed to the plow at its forward end, an outer bankboard parallel to the inner bankboard and fixed thereto at its rear end, a bowed rod connecting the free forward end of the outer bankboard to the inner bankboard, and a spiral spring surrounding said rod and fixed at its ends to said bankboards, substantially as set forth.

10. A ditch plow having means to form a continuous ridge at the side of the ditch comprising an inner bankboard, and an outer bankboard parallel to the inner bankboard, the two bankboards being adapted to receive earth from the plow and between them, a door at the rear end of the space between said bankboards having an opening to shape the earth into a continuous ridge, and means for holding the door in vertically adjusted position to vary the height of said ridges, substantially as set forth.

RENO MARTTAL.